US011869318B2

(12) United States Patent
Tougo et al.

(10) Patent No.: US 11,869,318 B2
(45) Date of Patent: Jan. 9, 2024

(54) MEDIUM PROCESSING APPARATUS

(71) Applicant: Glory Ltd., Hyogo (JP)

(72) Inventors: Hirofumi Tougo, Hyogo (JP);
Kazuhiko Takahashi, Hyogo (JP);
Kenta Takahashi, Hyogo (JP);
Takayuki Kuroda, Hyogo (JP);
Tomohiro Yokoo, Hyogo (JP)

(73) Assignee: Glory Ltd., Hyogo (JP)

(*) Notice: Subject to any disclaimer, the term of this patent is extended or adjusted under 35 U.S.C. 154(b) by 0 days.

(21) Appl. No.: 18/059,597

(22) Filed: Nov. 29, 2022

(65) Prior Publication Data

US 2023/0093434 A1     Mar. 23, 2023

Related U.S. Application Data

(63) Continuation of application No. 17/197,815, filed on Mar. 10, 2021, now Pat. No. 11,532,196.

(51) Int. Cl.
*G07F 7/04*     (2006.01)
*G07D 11/40*    (2019.01)
(Continued)

(52) U.S. Cl.
CPC .............. *G07F 7/04* (2013.01); *G06K 7/1413* (2013.01); *G06K 7/1417* (2013.01); *G07D 1/02* (2013.01);
(Continued)

(58) Field of Classification Search
CPC ........ G07F 7/04; G07F 7/1025; G07F 19/202; G07F 19/203; G07F 19/205; G06K 7/1413; G06K 7/1417; G07D 1/02; G07D 11/14; G07D 11/40; G07D 11/60; G07D 2201/00; G07D 2211/00; G07D 1/00; G07D 11/16;
(Continued)

(56) References Cited

U.S. PATENT DOCUMENTS 6,748,101 B1    6/2004  Jones et al.
8,545,295 B2   10/2013  Blake et al.
(Continued)

FOREIGN PATENT DOCUMENTS

CN    107710288 A  *  2/2018  ............. B65H 29/58
CN    110176096 A  *  8/2019  ............. G07D 11/14
(Continued)

OTHER PUBLICATIONS

CN107710288A Automatic Teller Machine, 15 pages (Year: 2023).*
(Continued)

*Primary Examiner* — Tuyen K Vo
(74) *Attorney, Agent, or Firm* — Fox Rothschild LLP

(57) ABSTRACT

The present disclosure provides a medium processing apparatus, including: a housing provided with a surface facing a customer operating the medium processing apparatus; and a rolled coin device housed in the housing and configured to process rolled coins formed by bundling a plurality of loose coins. The surface of the housing includes a designated area located in a height range conforming to Americans with Disabilities Act (ADA) standard with respect to a height direction of the medium processing apparatus, and a rolled coin dispensing port of the rolled coin device for dispensing the rolled coins is arranged in the designated area.

11 Claims, 9 Drawing Sheets

(51) Int. Cl.
*G07D 11/60* (2019.01)
*G07D 11/14* (2019.01)
*G06K 7/14* (2006.01)
*G07D 1/02* (2006.01)

(52) U.S. Cl.
CPC ............. *G07D 11/14* (2019.01); *G07D 11/40* (2019.01); *G07D 11/60* (2019.01); *G07D 2201/00* (2013.01); *G07D 2211/00* (2013.01)

(58) Field of Classification Search
CPC .... G06Q 20/102; G06Q 20/18; G06Q 20/204; G06Q 20/206; G06Q 20/209; G06Q 20/3274; G06Q 20/3278; G06Q 20/4012; G07G 1/0018
See application file for complete search history.

(56) References Cited

U.S. PATENT DOCUMENTS

| | | | | |
|---|---|---|---|---|
| 8,833,646 | B1 * | 9/2014 | Crews | G06Q 20/1085 |
| | | | | 902/4 |
| 8,959,029 | B2 | 2/2015 | Jones et al. | |
| 9,290,927 | B1 | 3/2016 | Sheley | |
| 9,430,893 | B1 | 8/2016 | Blake et al. | |
| 9,830,762 | B1 * | 11/2017 | Blake | G07D 3/16 |
| 9,858,558 | B1 * | 1/2018 | Cardinal | G07F 19/204 |
| 2006/0054690 | A1 | 3/2006 | Kallin | |
| 2009/0192938 | A1 * | 7/2009 | Amos | G07F 19/211 |
| | | | | 705/43 |
| 2009/0242626 | A1 | 10/2009 | Jones et al. | |
| 2014/0008431 | A1 * | 1/2014 | Patel | G07F 19/202 |
| | | | | 705/45 |
| 2014/0025200 | A1 * | 1/2014 | Smith | G07F 9/002 |
| | | | | 700/241 |
| 2015/0001289 | A1 * | 1/2015 | Smith | G07F 19/20 |
| | | | | 235/379 |
| 2015/0178692 | A1 * | 6/2015 | Nishida | G07D 7/12 |
| | | | | 705/45 |
| 2015/0287289 | A1 * | 10/2015 | Lewis | G07F 19/2055 |
| | | | | 235/379 |
| 2017/0124813 | A1 | 5/2017 | Misener | |
| 2018/0197157 | A1 * | 7/2018 | Magee | G07D 11/00 |
| 2018/0211468 | A1 * | 7/2018 | Teshima | B65H 3/0653 |
| 2019/0026970 | A1 | 1/2019 | Doi et al. | |

FOREIGN PATENT DOCUMENTS

| | | | | |
|---|---|---|---|---|
| JP | | 4682484 B2 * | 5/2011 | |
| JP | | 2016177596 A | 10/2016 | |
| WO | | 2005010835 A1 | 2/2005 | |
| WO | WO-2011153473 A3 * | | 2/2012 | ............... B23C 3/35 |

OTHER PUBLICATIONS

CN110176096A Self-service financial equipment, 5 pages (Year: 2023).*
JP4682484B2—Automatic cash transaction equipment, 11 pages. (Year: 2023).*
JP2001513920A—Automatic teller machine for the blind and visually impaired, 6 pages. (Year: 2023).*
JPH0652401A—Automatic Transaction Device Inclusively for Visually Handicapped Person, 6 pages. (Year: 2023).*

* cited by examiner

MEDIUM PROCESSING APPARATUS

CROSS REFERENCE TO RELATED APPLICATION

This application is a continuation of U.S. patent application Ser. No. 17/197,815, filed Mar. 10, 2021, the contents of which is incorporated herein by reference in its entirety.

TECHNICAL FIELD

The present disclosure relates to a medium processing apparatus.

BACKGROUND

As a medium processing apparatus, for example, an automatic teller machine (ATM) disclosed in patent document 1 includes a loose coin deposit/withdrawal device for processing a loose coin and a banknote deposit/withdrawal device for processing banknotes.
Prior Art Documents
Patent Document
Patent document 1: Japanese patent No. 2016-177596.

However, the ATM of patent document 1 does not possess the function of processing rolled coins formed by bundling a plurality of coins. Moreover, in terms of the configuration of the coin outlet, the design of the ATM does not give much consideration to the situation that some customers, e.g., customers who use wheelchairs (customers with inconvenient legs and feet) may use the services.

SUMMARY

In view of the above problems, an objective of the present disclosure is to provide a medium processing apparatus capable of improving the usability and meanwhile while having the function of processing rolled coins formed by bundling a plurality of coins.

In order to achieve the abovementioned objective, an embodiment of the present disclosure provides a medium processing apparatus comprising:

a housing provided with a surface facing a customer operating the medium processing apparatus; and a rolled coin device housed in the housing and configured to process rolled coins formed by bundling a plurality of loose coins, wherein the surface of the housing includes a designated area located in a height range conforming to Americans with Disabilities Act (ADA) standard with respect to a height direction of the medium processing apparatus, and a rolled coin dispensing port of the rolled coin device for dispensing the rolled coins is arranged in the designated area.

BRIEF DESCRIPTION OF THE DRAWINGS

FIG. 9A and FIG. 9B are explanatory diagrams of a key management machine of a medium processing apparatus according to an embodiment of the present disclosure, in which FIG. 9A is a front view of the key management machine, and FIG. 9B is a schematic diagram of a key holder.

DETAILED DESCRIPTION

Figure 1:
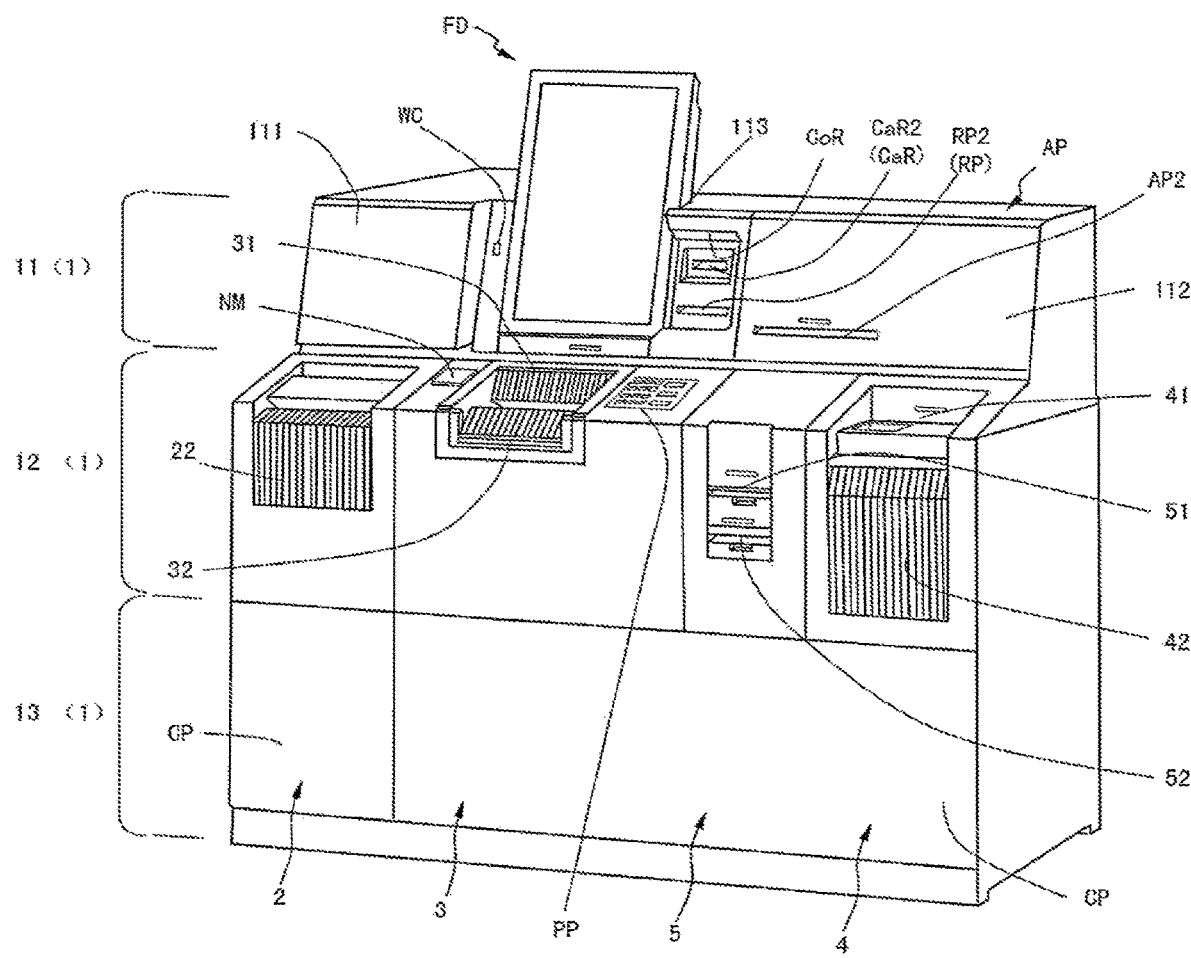
FIG. 1 is a perspective view of a medium processing apparatus according to an embodiment of the present disclosure.

Hereinafter, embodiments of the present disclosure will be described with reference to the accompanying drawings.

It is to be noted that, in the description of the present disclosure, the so-called ADA standard refers to a standard based on Americans with Disabilities Act (ADA), which aims to give disabled people equal opportunities with healthy people without discrimination.

In addition, the so-called customer refers to a person, for example, who uses the service such as the deposit/withdrawal service provided by the medium processing apparatus, and the so-called staff refers to a person, for example, who maintains the medium processing apparatus in a financial institution.

In addition, a side of the medium processing apparatus facing customers who using its deposit/withdrawal service is defined as a front side (front), a side opposite to the front side is defined as a rear side (rear), a direction horizontally orthogonal to a front-rear direction is defined as a width direction (transverse direction), and a direction orthogonal to both of the front-rear direction and the width direction (transverse direction) is defined as a height direction.

In addition, expressions such as "one element is located at a position lower than a position where another element is located" refer to that one element is located at a lower position than another element in the height direction, including the case where one element is located directly below another element and the case where one element is located at a position staggered from the "directly below" position in the width direction or the front-rear direction.

Similarly, expressions such as "one element is located at a position upper than a position where another element is located" refer to that one element is located at a higher position than another element in the height direction, including the case where one element is located directly above another element, and the case where one element is located at a position staggered from the "directly above" position in the width direction or the front-rear direction.

In addition, expressions such as "one element is located at a lateral side relative to another element" refer to that one element is located at a position staggered from another element in the transverse direction, including the case where one element is directly located at the lateral side of another element and the case where one element is located at a position staggered upwardly and downwardly or staggered forwardly and backwardly from the position directly located at the lateral side of another element.

In addition, "substantially parallel" includes an ideal parallel state, and a substantially parallel state inclined at a slight angle with respect to the ideal parallel state.

In addition, "approximately at the center" includes a state at the center and a state deviating from the state at the center by a small distance in the transverse direction.

The medium processing apparatus according to the embodiment of the present disclosure includes a housing 1 having a surface (hereinafter referred to as "front surface") facing a customer who operates the medium processing apparatus. A monetary medium such as banknote, a loose coin scattered one by one, rolled coins (coin roll) formed by bundling a prescribed number (for example, 50) of coins, or cheque, etc., is processed by using a processing device housed in the housing 1.

At first, the housing 1 forming an appearance of the medium processing apparatus will be briefly described. As illustrated in FIG. 1, a front surface of the housing 1 is divided into an upper area 11, a middle area 12 (a designated area) and a lower area 13 arranged in an order from top to bottom in the height direction. The upper area 11 is an area where, for example, a front display FD described later and some peripheral devices are provided. The middle area 12 is an area where ports (e.g., inserting port, dispensing port) of the aforementioned processing device, and some peripheral devices are provided. It is to be noted that, the upper area 11, the middle area 12, and the lower area 13 will be described later in details. The medium processing apparatus can perform a deposit process using at least one medium selected from the group consisting of coin, banknote, and cheque. The medium processing apparatus can also perform a withdrawal process using at least one medium selected from the group consisting of coin, banknote, and cheque. The medium processing apparatus can also perform a payment process of a payment bill (such as electricity bill, water bill, gas bill, EC (electronic commerce) bill, etc.) using at least one medium selected from the group consisting of coin, banknote, and cheque.

Figure 2:
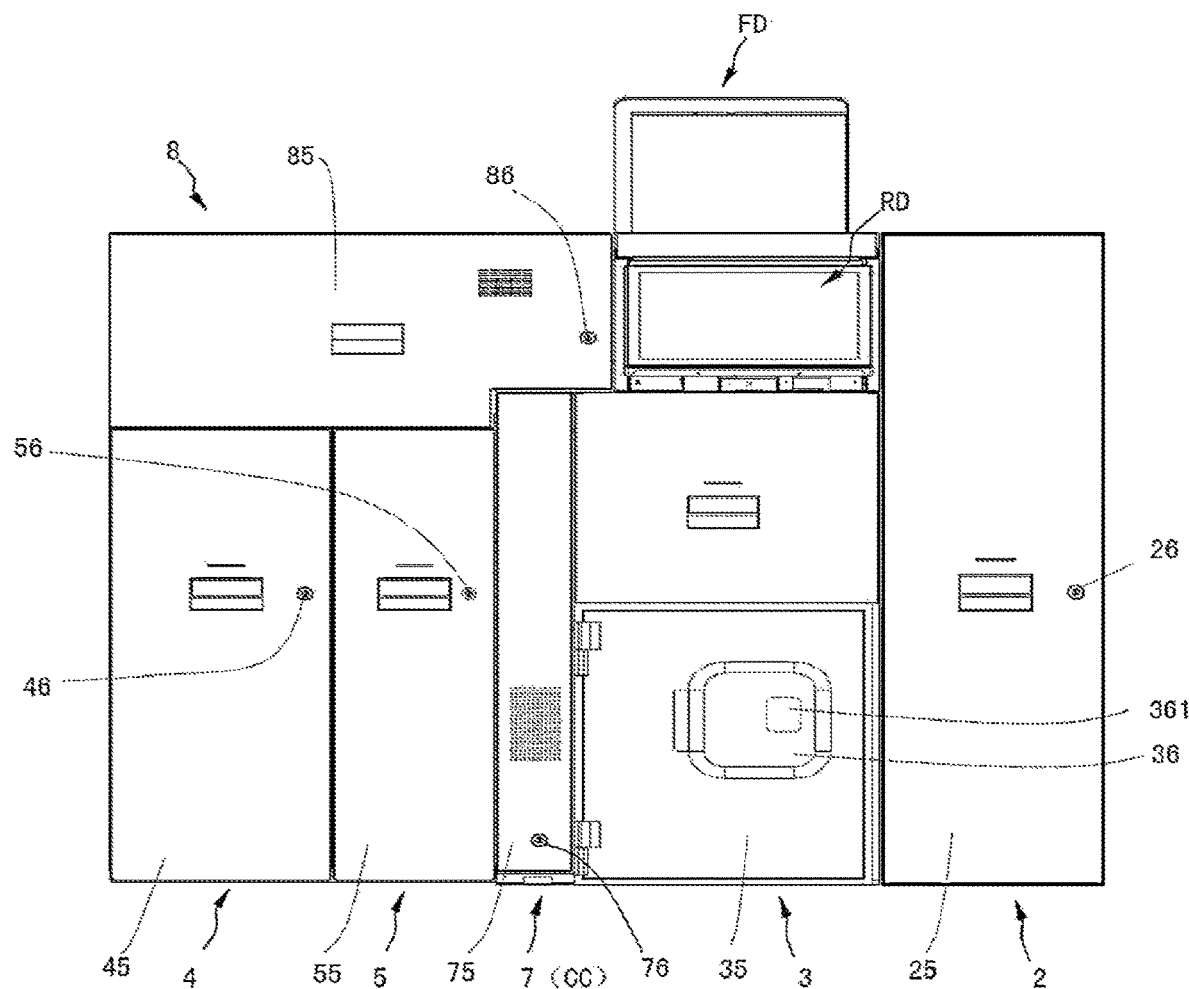
FIG. 2 is a rear view of a medium processing apparatus according to an embodiment of the present disclosure.
Figure 3:
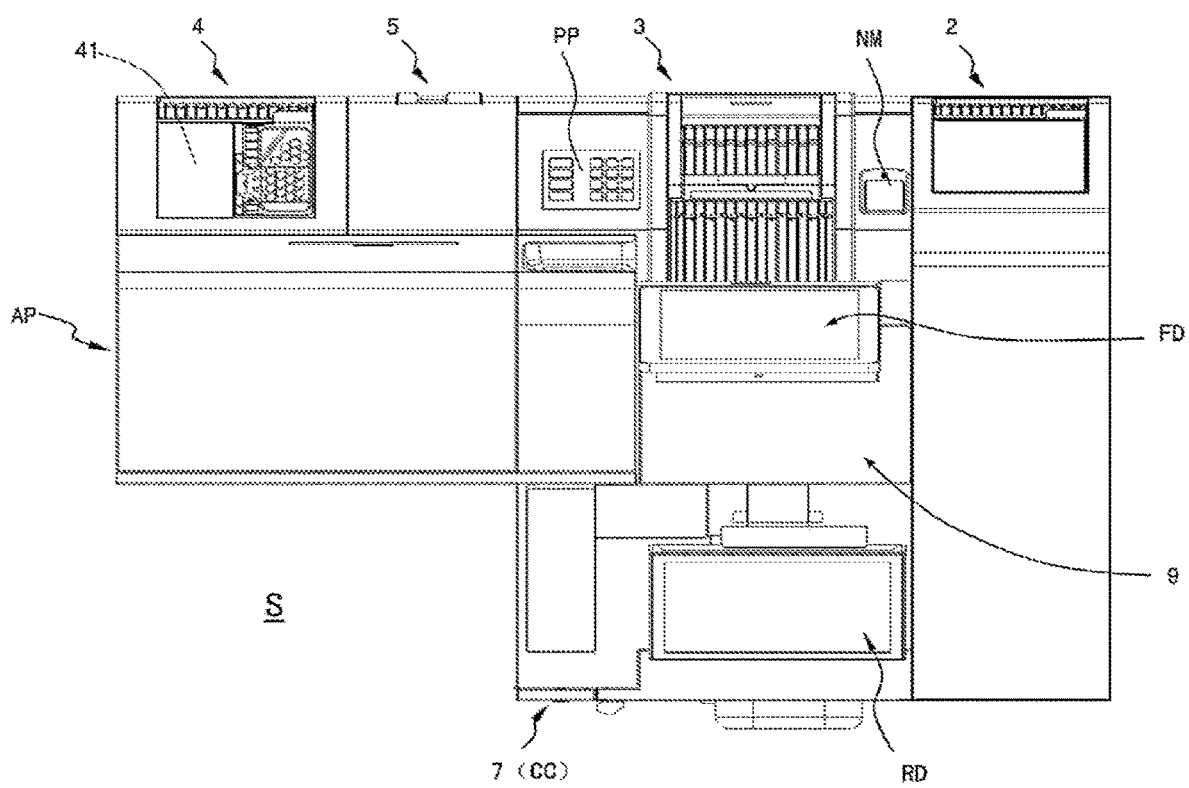
FIG. 3 is a top view of a medium processing apparatus according to an embodiment of the present disclosure.

In some embodiments, the medium processing apparatus provides a serve on rolled coins. Accordingly, as illustrated in FIG. 1 to FIG. 3, the medium processing apparatus comprises, for example, a rolled coin device 2 which is housed in the housing 1 and configured to process rolled coins formed by bundling a plurality of a loose coin.

It is to be noted that, in order to interact with customers or to control the operation of each device, the medium processing apparatus also comprises: a front display FD (display), which is arranged on the front surface of the housing 1 and includes a display surface for displaying information for customers to watch; a peripheral device housed in housing 1; a control device CC, which is housed in the housing 1 and controls the operation of the rolled coin device 2 and the operation of the peripheral device. In addition, the peripheral device includes, for example, a card reader CaR for reading a bank card, a PIN pad PP for inputting PIN information, and a receipt printer RP for printing transaction contents on a receipt. The control device CC is a computer that controls the medium processing apparatus, and includes a CPU (Central Processing Unit). In addition, the control device CC may also include a power supply. The control device CC controls various devices of the medium processing apparatus, such as the rolled coin device 2, the peripheral device, a banknote device 3, a loose coin device 4, a cheque device 5, etc. In addition, in the case where the medium processing apparatus includes a collection device 6 (drop box) described later, the control device CC controls the collection device 6. In addition, in the case where the medium processing apparatus includes a key management machine 9 described later, the control device CC may also control the key management machine 9.

For example, the rolled coin device 2 can perform a withdrawal process on rolled coins according to the following flow.
(1) A customer inserts a bank card into the card reader CaR;
(2) Next, the customer inputs PIN information through the PIN pad PP according to the guidance content displayed on the front display FD;
(3) Next, the customer selects a withdrawal service of rolled coins according to the guidance content displayed on the front display FD, and then inputs a withdrawal amount and confirms it; and
(4) Next, under the control of the control device CC, the rolled coin device 2 outputs and dispenses the rolled coins pre-stored in the coffer to the rolled coin dispensing port 22 with the withdrawal amount, and deducts the withdrawal amount from the account of the bank card.

In addition, upon a receipt printing instruction being input, the receipt printer RP prints the transaction contents on a receipt and dispenses the receipt from a receipt dispensing port RP2.

The middle area 12 of the housing 1 is located in a height range conforming to ADA standard with respect to the height direction of the medium processing apparatus, and the rolled coin dispensing port 22 of the rolled coin device 2 is arranged in the middle area 12. The rolled coin dispensing port 22 of the rolled coin device 2 includes a shutter. The rolled coin dispensing port 22 shown in FIG. 1 is in a state that the shutter is closed. The rolled coin device 2 can be configured in such a way that after rolled coins are dispensed from the rolled coin device 2 to the rolled coin dispensing port 22, the shutter is opened. The shutter may be formed of a member of which at least a part extends in the vertical direction.

The height range conforming to the ADA standard only needs to be a height which ranges from 15 inches to 48 inches from a bottom surface of the medium processing apparatus. Therefore, even a customer using a wheelchair can easily take out the rolled coins from the rolled coin dispensing port 22 at a lower position, and the usability of the medium processing apparatus can be improved. In other words, it is possible to improve the usability while having the function of processing rolled coins formed by bundling a plurality of coins.

It is to be noted that, with regard to the height range conforming to the ADA standard, the upper limit height can also be appropriately lowered and/or the lower limit height can also be appropriately increased for convenience. For example, the height range may range from 15 inches to 45 inches, ranges from 20 inches to 48 inches, ranges from 20 inches to 45 inches, or ranges from 25 inches to 40 inches.

Figure 4:
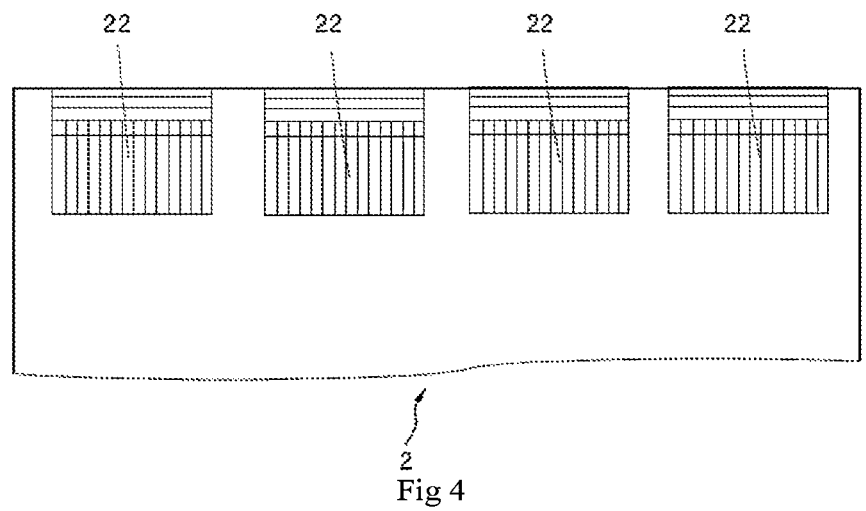
FIG. 4 is a structural example of a rolled coin dispensing port of a rolled coin device of a medium processing apparatus according to an embodiment of the present disclosure.

In some embodiments, as illustrated in FIG. 4, the rolled coin device 2 can be configured to include a plurality of rolled coin dispensing ports 22, which can be arranged in parallel along the transverse direction of the medium processing apparatus. In this case, the rolled coins can be dispensed from the rolled coin dispensing ports 22 according to the type of currency (e.g. denomination), and the usability can be improved.

Figure 5:
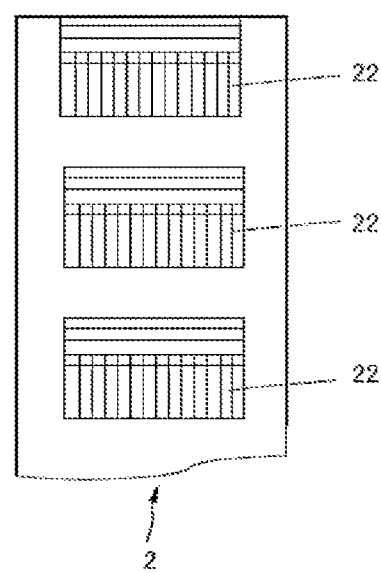
FIG. 5 is a structural example of a rolled coin dispensing port of a rolled coin device of a medium processing apparatus according to an embodiment of the present disclosure.

In addition, in some embodiments, as illustrated in FIG. 5, the rolled coin device 2 can be configured to include a plurality of rolled coin dispensing ports 22, which can be arranged in parallel along the height direction of the medium processing apparatus. Based on the type of currency (denomination) of the coins that make up the rolled coin determines the weight of a bundle of rolled coins is determined. Therefore, it is also possible to dispense each bundle of rolled coins having a large weight from the rolled coin dispensing port 22 at a position where the customer using the wheelchair can easily get the rolled coins. In addition, the dispensing port for dispensing the rolled coins of a specified currency can be arbitrarily selected from the plurality of rolled coin dispensing ports 22 by settings. In this case, the rolled coins can also be dispensed from the rolled coin dispensing ports 22 according to the type of currency (e.g. denomination), and the usability can be improved.

Figure 6:
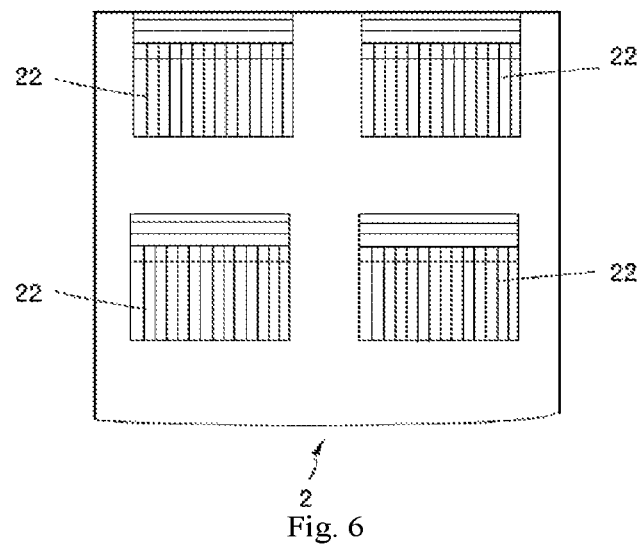
FIG. 6 is a structural example of a rolled coin dispensing port of a rolled coin device of a medium processing apparatus according to an embodiment of the present disclosure.

In addition, in some embodiments, as illustrated in FIG. 6, the rolled coin device 2 can be configured to include a plurality of rolled coin dispensing ports 22, which can be arranged in a matrix (N×M, N and M are natural numbers) along the transverse direction and the height direction. FIG. 6 is an example in which the rolled coin dispensing ports 22 are arranged in a 2×2 matrix. In this case, the rolled coins can also be dispensed from the rolled coin dispensing ports 22 according to the type of currency (e.g. denomination), and the usability can be improved.

Figure 7:
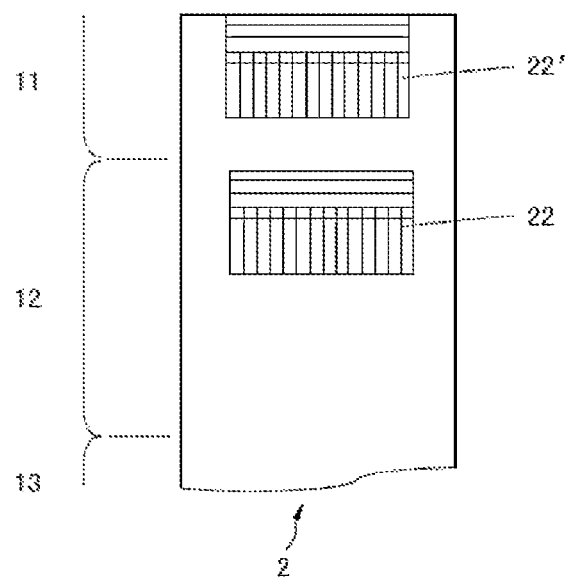
FIG. 7 is a structural example of a rolled coin dispensing port of a rolled coin device of a medium processing apparatus according to an embodiment of the present disclosure.

In this case, in some embodiments, as illustrated in FIG. 7, the rolled coin device 2 can be configured to include rolled coin dispensing ports 22 located in a height range conforming to the ADA standard and other coin wrapping ports 22' located outside the height range conforming to the ADA standard. In this case, the rolled coins can be dispensed from the rolled coin dispensing ports 22 or the other rolled coin dispensing ports 22' according to the selection of the customer, and the usability can be improved. For example, a customer who uses a wheelchair or a customer who is short in height can choose the rolled coin dispensing ports 22, while a customer who is tall in height can choose the other rolled coin dispensing ports 22'.

Figure 8:
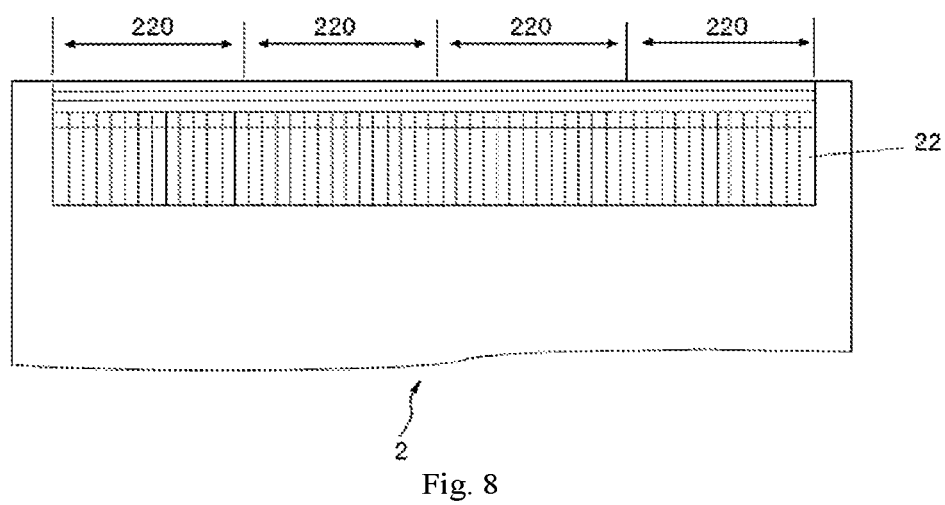
FIG. 8 is a structural example of a rolled coin dispensing port of a rolled coin device of a medium processing apparatus according to an embodiment of the present disclosure.

In addition, in some embodiments, the rolled coin dispensing port 22 of the rolled coin device 2, as illustrated in FIG. 8, may be formed to have a transversely elongated shape extending in the transverse direction of the medium processing apparatus. In addition, the rolled coin dispensing port 22 with the transversely elongated shape has a plurality of dispensing areas 220 in the transverse direction. In this case, the rolled coins can be dispensed from the dispense areas 220 according to the type of currency (e.g. denomination), and the usability of the medium processing apparatus can be improved.

In some embodiments, the medium processing apparatus further provides a banknote service. Accordingly, as illustrated in FIG. 1 to FIG. 3, the medium processing apparatus further comprises a banknote device 3, which is housed in the housing 1 and processes the banknote. The banknote device 3 is controlled by the control device CC (referring to FIG. 2). The banknote device 3 is provided with an identification device therein. The identification device can be used to identify a banknote inserted from a banknote input port 31.

For example, the banknote device 3 can perform a withdrawal process of banknote according to the following flow.

(1) A customer inserts a bank card into the card reader CaR;
(2) Next, the customer inputs the PIN information through the PIN pad PP according to the guidance content displayed on the front display FD;
(3) Next, the customer selects a withdrawal service of banknote according to the guidance content displayed on the front display FD, and then inputs a withdrawal amount and confirms it; and
(4) Next, under the control of the control device CC, the banknote device 3 outputs and dispenses the banknote pre-stored in the coffer to the banknote dispensing port 32 with the withdrawal amount, and deducts the withdrawal amount from the account at the same time.

In addition, upon a receipt printing instruction being input, the receipt printer RP prints the transaction contents on a receipt and dispenses the receipt from the receipt dispensing port RP2.

In addition, for example, the banknote device 3 can, for example, perform a deposit process of banknote according to the following flow.

(1) A customer inserts a bank card into the card reader CaR;
(2) Next, the customer inputs the PIN information through the PIN pad PP according to the guidance content displayed on the front display FD;
(3) Next, the customer selects a deposit service of banknote according to the guidance content displayed on the front display FD, and then puts banknote(s) into a banknote input port 31, confirms an amount and issues a deposit instruction; and
(4) Next, the banknote device 3 sends the banknote(s) to the coffer for storage under the control of the control device CC, and adds the amount to the account at the same time.

In addition, upon a receipt printing instruction being input, the receipt printer RP prints the transaction contents on a receipt and dispenses the receipt from the receipt dispensing port RP2.

As illustrated in FIG. 1, the banknote dispensing port 32 of banknote device 3 is arranged in the middle area 12 (designated area). Therefore, for example, even a customer using a wheelchair can easily take out the banknote from the banknote dispensing port 32 arranged at a lower position. The banknote dispensing port 32 of the banknote device 3 includes a shutter. The banknote dispensing port 32 shown in FIG. 1 is in a state that the shutter is closed. The banknote device 3 can be configured in such a way that: upon a banknote being dispensed from the banknote device 3 to the banknote dispensing port 32, the shutter is opened.

As illustrated in FIG. 1, the rolled coin dispensing port 22 of the rolled coin device 2 is arranged at a position lower than a position where the banknote dispensing port 32 of the banknote device 3 is located. In this case, because the rolled coin dispensing port 22 is arranged at a lower position, even a customer using a wheelchair can easily take out the rolled coins from the rolled coin dispensing port 22, which can improve the usability.

As illustrated in FIG. 1, the banknote input port 31 of the banknote device 3 is arranged in the middle area 12 (a designated area). Therefore, for example, even a customer using a wheelchair can easily put a banknote into the banknote input port 31 arranged at a lower position. The banknote input port 31 of the banknote device 3 includes a shutter. The banknote input port 31 shown in FIG. 1 is in a state that the shutter is closed. The banknote device 3 can be configured in such a way that: upon a banknote being dispensed from the banknote device 3 to the banknote input port 31, the shutter is opened. It is to be noted that, the PIN pad PP is, for example, a numeric keypad. The PIN pad PP may be arranged on a plane inclined with respect to the horizontal direction.

It is to be noted that, the banknote input port 31 and banknote dispensing port 32 of the banknote device 3 can also be formed integrally, thus making a banknote input/dispensing port for inputting and dispensing banknote. In this case, the structure of the banknote device 3 and even the entire structure of the medium processing apparatus can be simplified. In addition, the banknote input port 31 and/or the banknote dispensing port 32 may be configured in a height range other than the height range conforming to the ADA standard, for example, in a height range higher than the height range conforming to the ADA standard. In addition, the banknote device 3 can also only provide a withdrawal service as the banknote service. In this case, at least the banknote dispensing port 32 is provided, and the banknote input port 31 may be provided as well. Or, the banknote device 3 can only provide a deposit service as the banknote service. In this case, for the banknote input port 31 and the banknote dispensing port 32, only the former needs to remain.

In some embodiments, the medium processing apparatus further provides a loose coin service. In this case, as illustrated in FIG. 1, the medium processing apparatus further comprises a loose coin device 4, which is housed in the housing 1 and processes a loose coin. The loose coin device 4 is controlled by the control device CC (referring to FIG. 2). The loose coin device 4 is provided with an identification device therein. The identification device can be used to identify the a loose coin input from a loose coin input port 41.

For example, the loose coin device 4 can perform a withdraw process of a loose coin according to the following flow.

(1) A customer inserts a bank card into the card reader CaR;
(2) Next, the customer inputs the PIN information through the PIN pad PP according to the guidance content displayed on the front display FD;
(3) Next, the customer selects a withdrawal service of a loose coin, and then inputs a withdrawal amount and confirms it; and
(4) Next, under the control of the control device CC, the loose coin device 4 outputs and dispenses a loose coin pre-stored in the coffer to the loose coin dispensing port 42 with the withdrawal amount, and deducts the withdrawal amount from the account at the same time.

In addition, upon a receipt printing instruction being input, the receipt printer RP prints the transaction contents on a receipt and dispenses the receipt printed with the transaction contents from the receipt dispensing port RP2.

In addition, for example, the loose coin device 4 can perform a deposit process of a loose coin according to the following flow.

(1) A customer inserts a bank card into the card reader CaR;
(2) Next, the customer inputs the PIN information through the PIN pad PP according to the guidance content displayed on the front display FD;
(3) Next, the customer selects a deposit service of a loose coin according to the guidance content displayed on the front display FD, and then inputs a loose coin from the loose coin input port 41, confirms an amount and issues a deposit instruction;

(4) Next, under the control of the control device CC, the loose coin device 4 sends a loose coin to the coffer for storage, and adds the amount to the account.

In addition, upon the receipt printing instruction being input, the receipt printer RP prints the transaction contents on a receipt and dispenses the receipt printed with the transaction contents from the receipt dispensing port RP2.

As illustrated in FIG. 1, the loose coin dispensing port 42 of the loose coin device 4 is arranged in the middle area 12 (a designated area). Therefore, even a customer using a wheelchair can easily take out the a loose coin from the loose coin dispensing port 42 arranged at a lower position. The loose coin dispensing port 42 of the loose coin device 4 includes a shutter. The loose coin dispensing port 42 shown in FIG. 1 is in a state that the shutter is closed. The loose coin device 4 can be configured in such a way that upon a loose coin being dispensed from the loose coin device 4 to the loose coin dispensing port 42, the shutter is opened. The shutter may be formed of a member of which at least a part extends in the vertical direction.

As illustrated in FIG. 1, the loose coin dispensing port 42 of the loose coin device 4 is arranged at a position lower than a position where the banknote dispensing port 32 of the banknote device 3 is located. In this case, because the loose coin dispensing port 42 is arranged at a lower position, even a customer using a wheelchair can easily take out the a loose coin from the loose coin dispensing port 42, which can improve the usability.

As illustrated in FIG. 1, the loose coin input port 41 of the loose coin device 4 is arranged in the middle area 12 (a designated area). Therefore, even a customer using a wheelchair can easily put a loose coin into the loose coin input port 41.

It is to be noted that, the loose coin input port 41 and the loose coin dispensing port 42 of the loose coin device 4 can also be formed integrally, thus making a loose coin input/dispensing port for inputting and dispensing a loose coin. In this case, the structure of the loose coin device 4 and even the entire structure of the medium processing apparatus can be simplified. In addition, the loose coin input port 41 and/or the loose coin dispensing port 42 may also be configured in a height range other than the height range conforming to the ADA standard, for example, the loose coin input port 41 and/or the loose coin dispensing port 42 may be configured in a height range higher than the height range conforming to the ADA standard. In addition, the loose coin device 4 can also only provide the withdrawal service of a loose coin as the loose coin service. In this case, the loose coin input port 41 may be removed. Or, the loose coin device 4 may only provide a deposit service of a loose coin as the loose coin service. In this case, for the loose coin input port 41 and the loose coin dispensing port 42, only the former needs to remain.

In some embodiments, the medium processing apparatus further provides a cheque service. In this case, as illustrated in FIG. 1, the medium processing apparatus further comprises a cheque device 5, which is housed in the housing 1 and processes a cheque. The cheque device 5 is controlled by the control device CC (referring to FIG. 2). The cheque device 5 is provided with an identification device therein. The identification device can be used to identify the cheque inserted from the cheque inserting port 51.

For example, the cheque device 5 can perform a deposit process of cheque according to the following flow.

(1) A customer inserts a bank card into the card reader CaR;

(2) Next, the customer inputs the PIN information through the PIN pad PP according to the guidance content displayed on the front display FD;

(3) Next, the customer selects a deposit service of cheque according to the guidance content displayed on the front display FD, and then inserts a cheque from a cheque inserting port 51, confirms an amount of the cheque and other information and issues a deposit instruction; and (4) Next, the cheque device 5 sends the cheque to the coffer for storage under the control of the control device CC, and adds the amount to the account at the same time.

In addition, upon the receipt printing instruction being input, the receipt printer RP prints the transaction contents on a receipt and dispenses the receipt printed with the transaction contents from the receipt dispensing port RP2.

It is to be noted that, in the deposit process of cheque, the cheque that cannot be read by the identification device of the cheque device 5 is dispensed from a cheque dispensing port 52 of the cheque device 5.

As illustrated in FIG. 1, the cheque inserting port 51 of the cheque device 5 is arranged in the middle area 12 (a predetermined area). Therefore, even a customer using a wheelchair can easily insert a cheque from the cheque inserting port 51 arranged at a lower position.

As illustrated in FIG. 1, the cheque inserting port 51 is arranged at a position lower than a position where the banknote dispensing port 32 of the banknote device 3 is located. In this case, because the cheque inserting port 51 is arranged at a lower position, even a customer using a wheelchair can easily insert the cheque.

As illustrated in FIG. 1, the cheque dispensing port 52 of the cheque device 5 is arranged in the middle area 12 (designated area). In addition, the cheque dispensing port 52 is arranged at a position lower than a position where the banknote dispensing port 32 of the banknote device 3 is located. Therefore, even a customer using a wheelchair can easily take out the cheque from the cheque dispensing port 52.

It is to be noted that, the cheque inserting port 51 and the cheque dispensing port 52 may also be formed integrally, thus making a cheque inserting/dispensing port for inserting and dispensing a cheque. In this case, the structure of the cheque device 5 and even the entire structure of the medium processing apparatus can be simplified. In addition, the cheque inserting port 51 and/or the cheque dispensing port 52 may also be configured in a height range other than the height range conforming to the ADA standard.

The arrangement of the abovementioned devices is not limited. However, in the case where the rolled coin device 2, the banknote device 3 and the loose coin device 4 are included, if the rolled coin device 2, the banknote device 3 and the loose coin device 4 are sequentially arranged in the horizontal direction, it is helpful to improve the usability of the medium processing apparatus. In addition, in the case where the rolled coin device 2, the banknote device 3, the loose coin device 4 and the cheque device 5 are included, if the rolled coin device 2, the banknote device 3, the cheque device 5 and the loose coin device 4 are sequentially arranged in the transverse direction, it is helpful to improve the usability of the medium processing apparatus.

As illustrated in FIG. 3, in a plan view, the rolled coin device 2 and the banknote device 3 are configured in such a way that the rear portions of the rolled coin device 2 and the banknote device 3 are protruded towards a position which is further back to the rear portions of the loose coin device 4 and the cheque device 5. Therefore, the heights of the rolled coin device 2 and the banknote device 3 can be restricted, and various devices of the medium processing apparatus can be aligned in the height direction, so that the aesthetics can be improved. In addition, a concave space S can be formed between the rear portions of the rolled coin device 2 and the banknote device 3 and the rear portions of the loose coin device 4 and the cheque device 5, and the concave space S can be used as a maintenance space.

As illustrated in FIG. 1, the upper area 11 of the front surface of the housing 1 is configured to be withdrawn, in the front-rear direction of the medium processing apparatus, towards a position which is further back to the rear portions of the middle area 12 and the lower area 13. In addition, the upper area 11 of the front surface of the housing 1 comprises, for example, a first area 111 and a second area 112 recessed towards a rear side of the first area 111 in the width direction of the medium processing apparatus, and is formed in a stepped shape. In addition, a device surface of the first area 111 in the front surface and a device surface of the second area 112 in the front surface are formed in such a way that the device surface of the first area 111 and the device surface of the second area 112 are inclined backwardly and upwardly with respect to the height direction of the medium processing apparatus and are substantially parallel to each other. Therefore, the overall aesthetics of the medium processing apparatus can be improved. It is to be noted that, inclination angles of the device surfaces of the first area 111 and the second area 112 may, for example, range from 10 degrees to 45 degrees. In addition, the inclination angles of the device surfaces of the first area 111 and the second area 112 may also range from 15 degrees to 30 degrees.

The front display FD is arranged in the second area 112 of the upper area 11; for example, the front display FD is arranged above (for example, directly above) the banknote device 3. For example, the front display FD is arranged in the second area 112 in such a way that a display surface of the front display FD is recessed towards the rear side by a predetermined amount with respect to the device surface of the first area 111. The predetermined amount may be, for example, 5 cm or more. In addition, the predetermined amount may be, for example, 15 cm or less. Therefore, not only the operability of the medium processing apparatus can be raised, but also the design and aesthetics can be improved. In addition, when the customer operates the medium processing apparatus, the medium processing apparatus can prevent others from peeping at the display content from a lateral side.

As illustrated in FIG. 1, a concave portion (groove) 113 is formed in the second area 112, the concave portion (groove) 113 has a shape matched with a shape of the lower half portion of the front display FD (at least a part of the display), and the front display FD is arranged in the second area 112 in such a way that the lower half portion of the front display FD is housed in the concave portion 113. Therefore, without excessively setting the step difference between the first area 111 and the second area 112, it is possible to ensure that the amount of the display surface of the front display FD recessed with respect to the device surface of the first area 111 is equal to or more than the predetermined amount, which contributes to improving the design and aesthetics.

As illustrated in FIG. 1, the front display FD is installed in the second area 112 of the upper area 11 in such a way that the display surface of the front display FD inclines upwardly and backwardly with respect to the height direction of the medium processing apparatus. Therefore, the visibility and operability of the front display FD can be improved. It is to be noted that, the inclination angle of the display surface of the front display FD may, for example, range from 10 degrees to 45 degrees. In addition, the inclination angle of the display surface of the front display FD may also range from 15 degrees to 30 degrees.

As illustrated in FIG. 1, the front display FD is arranged in such a way that the display surface of the front display FD is substantially parallel to the device surface of the second area 112. That is, the front display FD has a structure in which the display surface of the front display FD is substantially parallel to a portion of the device surface of the second area 112 around the concave portion 113. Therefore, the overall aesthetics of the medium processing apparatus can be further improved.

The front view shape of the front display FD is not particularly limited. However, if the front view shape of the front display FD is a longitudinally elongated rectangular shape which includes a pair of short edges substantially parallel to the transverse direction of the medium processing apparatus and a pair of long edges extending in a direction perpendicular to the pair of short edges and longer than the pair of short edges, the visibility and operability of the front display FD can be improved with respect to the case where the front view shape of the front display FD is a transversely elongated rectangular shape or a square shape.

In addition, in the case where the front view shape of the front display FD is a longitudinally elongated rectangular shape, a range in which the middle area 12 of the housing 1 is formed may be set between a lower end position of the front display FD and a position spaced apart downwardly from the lower end position of the front display FD by a length of the long edge, in the height direction of the medium processing apparatus. In addition, on the display surface of the front display FD, information can be displayed in various ways. For example, in the case where the medium processing apparatus is not used by any customer, advertisements that can be seen by people far away from the medium processing apparatus can be displayed on an upper portion of the display surface of the front display FD. In addition, in the case where the medium processing apparatus is used by a customer, information for customers to operate can be displayed on a lower portion of the display surface of the front display FD.

In addition, the front display FD may be a touch display that accepts an input operation by a customer. Therefore, the operability of the medium processing apparatus can be improved.

A card reader CaR reads a bank card inserted from a card inserting/dispensing port CaR2 formed in the second area 112 of the upper area 11 of the front surface of the housing 1. As illustrated in FIG. 1, with respect to the front display FD, the card reader CaR is arranged at an adjacent portion located at a lateral area of the front display FD. Therefore, the operability of the whole medium processing apparatus can be improved.

A receipt printer RP prints transaction contents on a receipt, and dispenses the receipt from a receipt dispensing port RP2 formed in the second area 112 of the upper area 11 of the front surface of the housing 1. As illustrated in FIG. 1, with respect to the front display FD, the receipt printer RP is arranged at an adjacent portion located at a lateral area of the front display FD. Therefore, the operability of the whole medium processing apparatus can be improved.

For example, a PIN pad PP is a keyboard for customers to input PIN information. As illustrated in FIG. 1, with respect to the front display FD, the PIN pad PP is arranged at an adjacent portion located at a lateral area of the front display FD. Therefore, the operability of the whole medium processing apparatus can be improved.

In some embodiments, as illustrated in FIG. 1, peripheral devices such as a code reader CoR for reading bar codes and/or two-dimensional codes, a web camera WC for taking pictures/videos of customers, and an NFC device NM for near field communication with customers' portable devices can be provided, so as to conveniently collect customer information. In this case, similarly to the card reader CaR, the receipt printer RP and the PIN pad PP, if the code reader is arranged, with respect to the front display FD, at an adjacent portion located at a lateral area of the front display FD, the operability of the whole medium processing apparatus can be improved. The code reader CoR can read the bar codes or two-dimensional codes recorded on a payment bill placed under the code reader CoR. A payment process can be performed by using the information read by the code reader CoR. For example, the payment bill is an electricity bill, a water bill, a gas bill, an EC (Electronic Commerce) bill, etc.

In some embodiments, as illustrated in FIG. 1, for example, the card reader CaR, the code reader CoR, the receipt printer RP, and the PIN pad PP are located approximately at the center in the transverse direction. That is to say, distances from the customer who stands near the card reader CaR and operates the medium processing apparatus to two ends of the medium processing apparatus in the width direction are approximately the same. Therefore, the customer can reach the processing devices (the rolled coin device 2 and the loose coin device 4 in the example of FIG. 1) at both ends of the medium processing apparatus without large movements, and the usability can be improved.

In some embodiments, as illustrated in FIG. 1, an A4 printer AP for printing transaction contents is provided in the upper area 11 of the housing 1. For example, the A4 printer AP is used in the case where past transaction histories or the like are printed or a large number of contents are printed. The A4 printer AP is provided with an A4 dispensing port AP2 in the upper area 11 of the housing 1. The A4 dispensing port AP2 is provided, for example, on a side of the upper area 11 close to the front display FD. The A4 printer AP prints the transaction contents on a receipt and then dispenses the receipt from the A4 dispensing port AP2.

As illustrated in FIG. 1, the A4 printer AP is arranged on an upper rear portion of the loose coin device 4 and the cheque device 5 so as to be adjacent to the code reader CoR, the card reader CaR and the receipt printer RP in the width direction of the medium processing apparatus.

In the lower area 13 of the front surface of the housing 1, a cover plate CP is provided to shield front sides of the rolled coin device 2, the banknote device 3, the loose coin device 4 and the cheque device 5. The cover plate CP can be made of metal, resin and the like. With the cover plate CP, even if the customer's foot or a wheelchair comes into contact with the medium processing apparatus, the medium processing apparatus can be prevented from being damaged.

In come embodiments, as illustrated in FIG. 2, the rear side of the medium processing apparatus is provided with a door for opening and closing the abovementioned devices. Each of the plurality of devices is provided with a door. A lock is provided on the door of each of the plurality of devices. The lock is an electromagnetic lock or a non-electromagnetic manual lock. The electromagnetic lock is, for example, a numeric keypad, which can perform a switching between a locked state and an unlocked state by operating an authentication information input device. For example, the non-electromagnetic manual lock can perform a switching between the locked state and the unlocked state by using a metal key. These doors can be opened and closed independently. Therefore, when the door is opened, the staff can operate the device corresponding to the door.

For example, the banknote device 3 is provided with a banknote device door 35 at a rear side of the banknote device 3. The banknote device door 35 can open and close an opening of a safe box of the banknote device 3. The inside of banknote device 3 can be seen by opening the banknote device door 35. When the banknote device door 35 is opened, the staff can put banknote(s) into or take banknote(s) out of the safe box of the banknote device 3.

The banknote device door 35 is provided with a banknote device lock 36. The banknote device lock 36 can switch the banknote device door 35 between a locked state and an unlocked state. The banknote device door 35 can be opened towards a rear side after being switched to the unlocked state by the banknote device lock 36, and the banknote device 3 is brought into a closed state after the banknote device door 35 is switched to the locked state by the banknote device lock 36.

In addition, the banknote device lock 36 can perform a switching between the locked state and the unlocked state independently from the locks of other devices.

In some embodiments, the banknote device lock 36 may be an electromagnetic lock.

As an example of the banknote device lock 36, an authentication information input device 361 is arranged at the banknote device door 35, and the banknote device lock 36 can perform a switching between the locked state and the unlocked state according to the authentication information as input. In the present example, the authentication information input device 361 may be a numeric keypad.

In addition, as another example of the banknote device lock 36, the banknote device lock 36 can perform a switching between the locked state and the unlocked state according to the ID input by the staff using a rear display RD described later.

For example, the loose coin device 4 is provided with a loose coin device door 45 at a rear side of the loose coin device 4. The loose coin device door 45 can open and close an opening of a safe box of the loose coin device 4. The inside of the loose coin device 4 can be seen by opening the loose coin device door 45. When the loose coin device door 45 is opened, the staff can put a loose coin into or take a loose coin out of the safe box of the loose coin device 4.

The loose coin device door 45 is provided with a loose coin device lock 46. The loose coin device lock 46 can switch the loose coin device door 45 between a locked state and an unlocked state. The loose coin device door 45 can be opened towards the rear side after being switched to the unlocked state by the loose coin device lock 46, and the loose coin device 4 is brought into a closed state after the loose coin device door 45 is switched to the locked state by the loose coin device lock 46.

In addition, the loose coin device lock 46 can perform a switching between the locked state and the unlocked state independently from the above-mentioned banknote device lock 36 and locks of other devices.

In some embodiments, the loose coin device lock 46 may be a non-electromagnetic manual lock.

As an example of the loose coin device lock 46, it may be a manual lock that can perform a switching between the locked state and the unlocked state by using a dedicated loose coin device key.

For example, the cheque device 5 is provided with a cheque device door 55 at a rear side of the cheque device 5. The cheque device door 55 can open and close an opening of a safe box of the cheque device 5. The inside of cheque device 5 can be seen by opening the cheque device door 55. When the cheque device door 55 is opened, the staff can put cheque(s) into or take cheque(s) out of the safe box of the cheque device 5.

The cheque device door 55 is provided with a cheque device lock 56. The cheque device lock 56 can switch the cheque device door 55 between a locked state and an unlocked state. The cheque device door 55 can be opened towards the rear side after being switched to the unlocked state by the cheque device lock 56, and the cheque device 5 is brought into a closed state after the cheque device door 55 is switched to the locked state by the cheque device lock 56.

In addition, the cheque device lock 56 can perform a switching between the locked state and the unlocked state independently from the above-mentioned banknote device lock 36, loose coin device lock 46, and locks of other devices.

In some embodiments, the cheque device lock 56 may be a non-electromagnetic manual lock.

As an example of the cheque device lock 56, it may be a manual lock that can perform a switching between the locked state and the unlocked state by using a dedicated cheque device key.

For example, the rolled coin device 2 is provided with a rolled coin device door 25 at the rear side of the rolled coin device 2. The rolled coin device door 25 can open and close an opening of a safe box of the rolled coin device 2. The inside of the rolled coin device 2 can be seen by opening the rolled coin device door 25. When the rolled coin device door 25 is opened, the staff can put rolled coins into or take rolled coins out of the safe box of the rolled coin device 2.

The rolled coin device door 25 is provided with a rolled coin device lock 26. The rolled coin device lock 26 can switch the rolled coin device door 25 between a locked state and an unlocked state. The rolled coin device door 25 can be opened towards the rear side after being switched to the unlocked state by the rolled coin device lock 26, and the rolled coin device 2 is brought into a closed state after the rolled coin device door 25 is switched to the locked state by the rolled coin device lock 26.

In addition, the rolled coin device lock 26 can perform a switching between the locked state and the unlocked state independently from the banknote device lock 36, the loose coin device lock 46, the cheque device lock 56, and locks of other devices.

In some embodiments, the rolled coin device lock 26 may be a non-electromagnetic manual lock.

As an example of the rolled coin device lock 26, it may be a manual lock that can perform a switching between the locked state and the unlocked state by using a dedicated rolled coin device key.

In some embodiments, a control device box 7 is a part of the housing 1 that houses the above-mentioned control device CC. A control device box door 75 is provided at the rear side of the control device box 7. The control device box door 75 can open and close an opening of the control device box 7. When the control device box door 75 is opened, the staff can operate the control device CC. Maintenance or repair of the control device CC can be performed by opening the control device box door 75.

The control device box door 75 is provided with a control device box lock 76. The control device box lock 76 can switch the control device box door 75 between a locked state and an unlocked state. The control device box door 75 can be opened towards the rear side after being switched to the unlocked state by the control device box lock 76, and the control device box 7 is brought into a closed state after the control device box door 75 is switched to the locked state by the control device box lock 76.

In addition, the control device box lock 76 can perform a switching between the locked state and the unlocked state independently from the above-mentioned banknote device lock 36, loose coin device lock 46, cheque device lock 56, rolled coin device lock 26, and locks of other devices.

In some embodiments, the control device box lock 76 may be a non-electromagnetic manual lock.

As an example of the control device box lock 76, it may be a manual lock that can perform a switching between the locked state and the unlocked state by using a dedicated control device box key.

In some embodiments, a peripheral device box 8 is a part of the housing 1 that houses at least one peripheral device selected from the group consisting of a code reader CoR, a card reader CaR, a receipt printer RP, a PIN pad PP, and an A4 printer AP. At a rear side of the peripheral device box 8, a peripheral device box door 85 is provided. The peripheral device box door 85 can open and close an opening of the peripheral device box 8. When the peripheral device box door 85 is opened, the staff can operate the various peripheral devices. For example, the various peripheral devices can be maintained or repaired by opening the peripheral device box door 85. For example, filling a paper box of the printer or replacing consumables can be performed. In addition, inside the peripheral device box 8, the arrangement positions of the peripheral devices can be appropriately changed. For example, the code reader CoR, the card reader CaR and the receipt printer RP can be arranged in corresponding areas above the banknote device 3 and the control device box 7. For example, the A4 printer AP may be arranged in a corresponding area above the loose coin device 4 and cheque device 5.

The peripheral device box door 85 is provided with a peripheral device box lock 86. The peripheral device box lock 86 can switch the peripheral device box door 85 between a locked state and an unlocked state. The peripheral device box door 85 can be opened towards the rear side after being switched to the unlocked state by the peripheral device box lock 86, and the peripheral device box 8 is brought into a closed state after the peripheral device box door 85 is switched to the locked state by the peripheral device box lock 86.

In addition, the peripheral device box lock 86 can perform a switching between the locked state and the unlocked state independently from the above-mentioned banknote device lock 36, loose coin device lock 46, cheque device lock 56, rolled coin device lock 26, control device box lock 76, and locks of other devices.

In some embodiments, the peripheral device box lock 86 may be a non-electromagnetic manual lock.

As an example of the peripheral device box lock 86, it may be a manual lock that can perform a switching between the locked state and the unlocked state by using a dedicated peripheral device box key.

In some embodiments, as illustrated in FIGS. 2 and 3, the medium processing apparatus comprises, for example, a rear display RD used during maintenance. The front display FD is mainly used by customers, and the rear display RD is mainly used by bank employees or principals of cash centers. The rear display RD may be a touch display that receives an input operation by a staff. In the banknote device 3, a part protruding to the rear sides of the loose coin device 4 and the cheque device 5 includes a portion with a height smaller than the maximum height of the housing 1, and the rear display RD may be arranged on this portion. In addition, the rear display RD is arranged on the back side of the front display FD. The rear display RD and the front display FD may be arranged at positions which are corresponding to each other in the transverse direction (the arrangement direction of the devices).

As illustrated in FIG. 2 and FIG. 3, the rear display RD is arranged in such a way that a display surface of the rear display RD faces backward and upward. Therefore, the visibility and operability of the rear display RD can be improved. An inclination angle of the display surface of the rear display RD may, for example, range from 30 degrees to 70 degrees. Or, the inclination angle of the display surface of the rear display RD may range from 40 degrees to 60 degrees.

In some embodiments, the rear portion of the medium processing apparatus is provided with a USB interface for expansion. The USB interface may be configured at the rear portion of the rear display RD, for example. By configuring the USB interface, an additional peripheral device (for example, a passbook printer, etc.) can be connected, thereby improving the universality of the medium processing apparatus.

In several embodiments, the medium processing apparatus may include a key management machine 9.

The key management machine 9 can be an independent device, or it can be arranged at a certain position on the medium processing apparatus, for example, a position between the front display FD and the rear display RD. The key management machine 9 can also be arranged at a position separate from the medium processing apparatus.

Figure 9A:
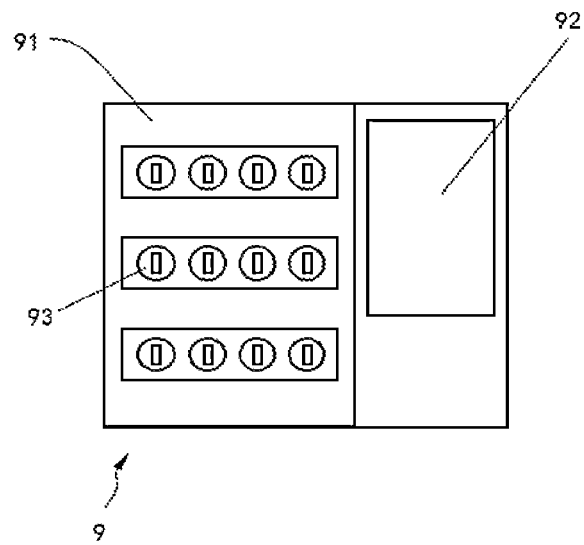

As illustrated in FIG. 9A, the key management machine 9 may include a key storage portion 91 and an operation device 92, and the key storage portion 91 may store at least one key selected from the group consisting of the loose coin device key, the rolled coin device key, the cheque device key, the control device box key, and the peripheral device box key which are described above.

A plurality of key holders 93 may be provided in the key housing portion 91. Twelve key holders 93 are shown in FIG. 9A, but the number of the key holders are not limited thereto.

Each of the key holders 93 can hold at least one key. Each of the key holders 93 can be switched between a fixed state and an unfixed state independently. In the fixed state, a key is fixed and cannot be removed from the key holder 93. On the other hand, in the unfixed state, a key can be taken from the key holder 93.

The operation device 92 may include a keyboard, a touch display, or the like. The key management machine 9 can switch the key holder 93 into an unfixed state according to the ID or authentication information as input by the staff using the operating device 92. The key management machine 9 can also be controlled by the control device CC, in this case, the key holder 93 can be switched to an unfixed state by operating the rear display RD.

Figure 9B:
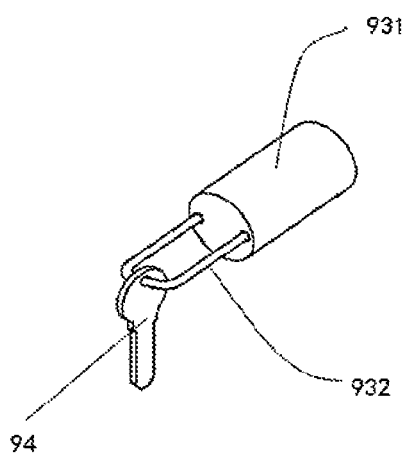

In some embodiments, as an example of the key holder 93, it can be formed into the structure shown in FIG. 9B.

The key holder 93 includes a holder body 931 and a ring 932 connected to the holder body 931. A key 94 may be mounted on the ring 932.

Upon the key holder 93 being switched to the fixed state, the ring 932 is locked to the holder body 931, so that the key 94 cannot be taken from the ring 932. On the other hand, upon the key holder 93 being switched to the unfixed state, the locking between the ring 932 and the holder body 931 can be released, and the key 94 can be taken from the ring 932.

Figure 10:
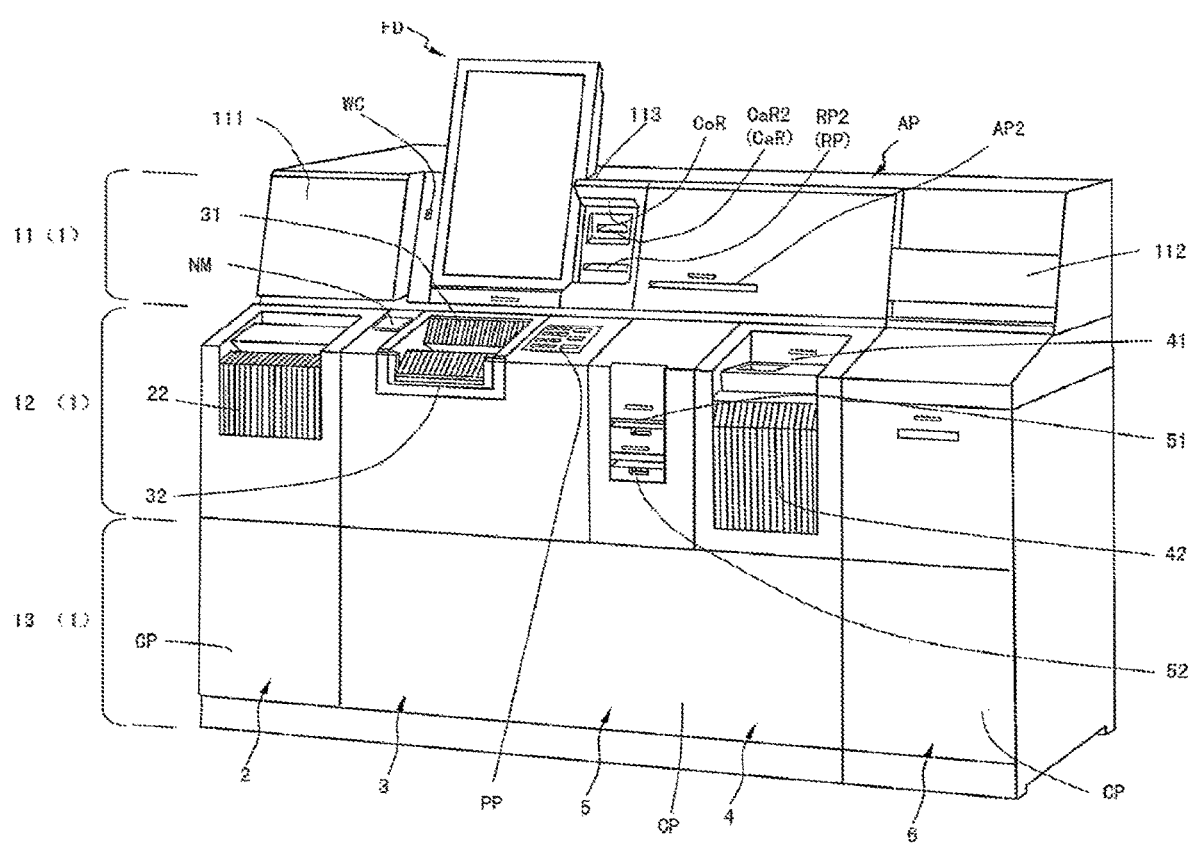
FIG. 10 is a perspective view of a medium processing apparatus according to an embodiment of the present disclosure.

In some embodiments, as illustrated in FIG. 10, the medium processing apparatus may further include a collection device 6. Envelopes containing mediums can be put into the collection device 6. The medium in the envelope is, for example, banknote, loose coin, cheque or the like in a poor state. The envelope is only an example of a container, which can also be a bag, etc. The collection device 6 is laterally adjacent to the loose coin device 4 in the width direction of the medium processing apparatus. The banknote, loose coin and cheque that have been identified but have not been delivered to the safe box due to their poor state (damage, pollution, etc.) will be put into the envelope and delivered to the collection device 6. The medium that is delivered to the collection device 6 can be handled by the staff later.

Figure 11:
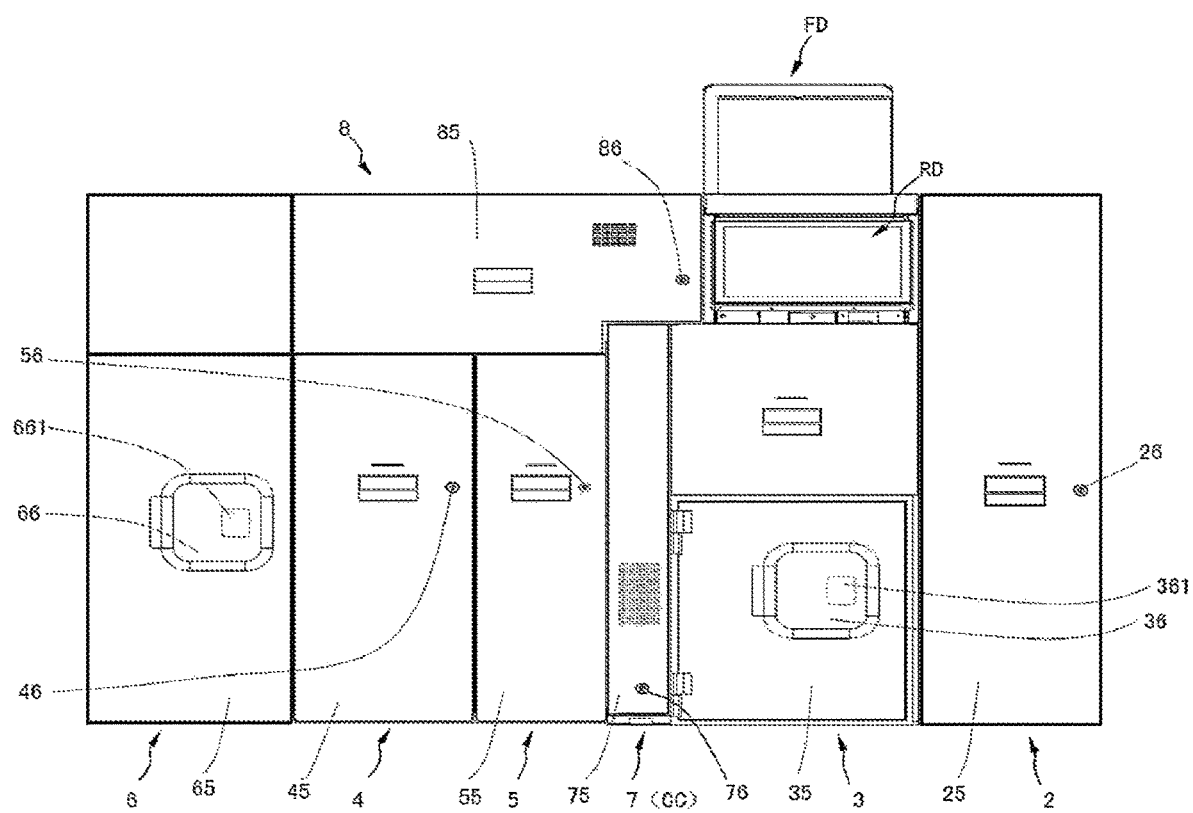
FIG. 11 is a rear view of a medium processing apparatus according to an embodiment of the present disclosure.
Figure 12:
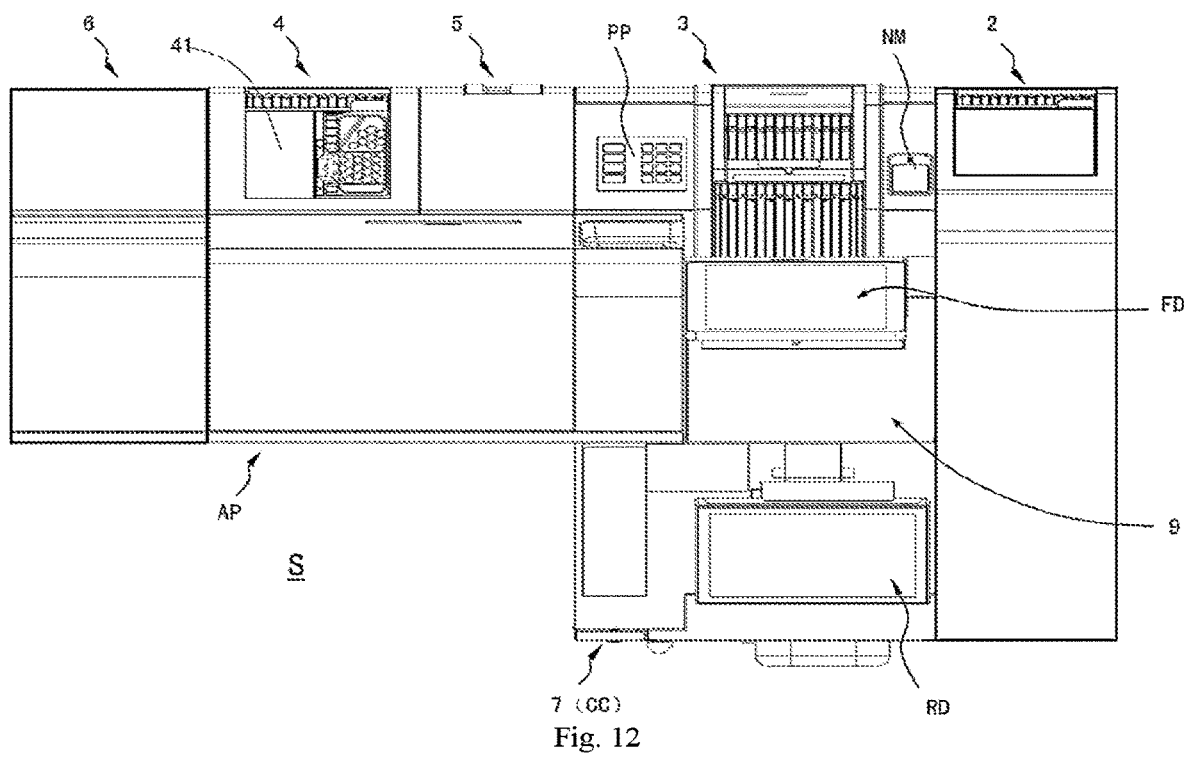
FIG. 12 is a top view of a medium processing apparatus according to an embodiment of the present disclosure.

As illustrated in FIG. 11 and FIG. 12, in the top view, rear portions of the rolled coin device 2 and the banknote device 3 may be protruded towards a position which is further back to the rear portions of the loose coin device 4, the cheque device 5, and the collection device 6. Therefore, a concave space S is formed between the rear portions of the rolled coin device 2 and the banknote device 3 and the rear portions of the loose coin device 4, the cheque device 5, and the collection device 6. The concave space S can be used as a maintenance space.

In some embodiments, as illustrated in FIG. 11, the collection device 6 is provided with a collection device door 65 at the rear side of the collection device 6. The collection device door 65 can open and close an opening of a safe box of the collection device 6. The inside of the collection device 6 can be seen by opening the collection device door 65. After opening the collection device door 65, the staff can put banknote(s), loose coin(s), cheque(s) and the like into the safe box of the collection device 6 or take them out of the safe box of the collection device 6.

The collection device door 65 is provided with a collection device lock 66. The collection device lock 66 can switch the collection device door 65 between a locked state and an unlocked state. The collection device door 65 can be opened towards the rear side after being switched to the unlocked state by the collection device lock 66, and the collection device 6 is brought into a closed state after the collection device door 65 is switched to the locked state by the collection device lock 66.

The collection device lock 66 can perform a switching between the locked state and the unlocked state independently from the above-mentioned banknote device lock 36, loose coin device lock 46, cheque device lock 56, rolled coin device lock 26, control device box lock 76, and peripheral device box lock 86.

In some embodiments, the collection device lock 66 may be an electromagnetic lock.

As an example of the collection device lock 66, an authentication information input device 661 is arranged at the collection device door 65, and the collection device lock 66 can perform a switching between the locked state and the unlocked state according to the authentication information as input. In this example, the authentication information input device 661 may be a numeric keypad.

In addition, as another example of the collection device lock 66, it can perform a switching between the locked state and the unlocked state according to the ID input by the staff using the rear display RD described above.

According to the present disclosure, the medium processing apparatus is provided with a rolled coin device for processing rolled coins formed by bundling a plurality of loose coins, and a rolled coin dispensing port of the rolled coin device is configured at a height conforming to ADA standard, so that the objective of "providing a medium processing apparatus capable of processing rolled coins formed by bundling a plurality of coins and meanwhile improving the usability" can be achieved.

Several embodiments of the present disclosure have been described above, but the present disclosure is not limited to these embodiments. Without departing from the spirit of the present disclosure, combinations of various embodiments, as well as additions, omissions, alternations and other changes of constituent elements can be made.

What is claimed is:

1. A medium processing apparatus comprising:
a housing provided with a surface facing a user operating the medium processing apparatus;
the surface of the housing including a first surface, a second surface located below the first surface, and a third surface located below the second surface, wherein each of the second surface and the third surface comprises a designated area located in a height range conforming to Americans with Disabilities Act (ADA) standard with respect to a height direction of the medium processing apparatus;
a display arranged on the first surface of the housing and configured to display information for the user to watch;
a card reader arranged on the first surface of the housing;
a detector which obtains information of the user and is arranged on the designated area of the second surface of the housing;
a PIN pad arranged on the designated area of the second surface, the PIN pad having mechanical keys; and
a banknote dispensing port arranged on the designated area of the third surface
wherein the banknote dispensing port is arranged immediately below a lower edge of the display in a viewpoint of the user who watches the display,
in a horizontal direction, a center position of the banknote dispensing port and a center position of the display are in close proximity,
in the horizontal direction, the banknote dispensing port is located within a width of the display,
the card reader is offset from the center position of the banknote dispensing port to one direction in the horizontal direction, and
the detector is offset from the banknote dispensing port to the other direction in the horizontal direction.

2. The medium processing apparatus of claim 1, wherein the PIN pad is arranged below the card reader, and wherein the banknote dispensing port is arranged below the PIN pad.

3. The medium processing apparatus of claim 2, further comprising a printer arranged on the first surface of the housing, wherein the PIN pad is arranged below the printer, and wherein the banknote dispensing port is arranged below the PIN pad.

4. The medium processing apparatus of claim 3, wherein the printer is arranged below the card reader.

5. The medium processing apparatus of claim 1, wherein the detector is a NFC device, and wherein the NFC device is laterally offset from the PIN pad.

6. The medium processing apparatus of claim 5, wherein the PIN pad is laterally right offset from the NFC device in a viewpoint of the user who watches the display.

7. The medium processing apparatus of claim 1, wherein an angle of the second surface is smaller than an angle of the third surface, with respect to a horizontal plane.

8. The medium processing apparatus of claim 7, wherein the third surface is substantially parallel to a vertical plane.

9. The medium processing apparatus of claim 1, wherein, in a region of the medium processing apparatus where the user faces the medium processing apparatus, a width of the surface of the housing is less than a width that is twice as long as a width of the display.

10. The medium processing apparatus of claim 1, wherein the medium processing apparatus is a banknote processing machine having the banknote dispensing port, and wherein an additional unit is laterally attached to the medium processing apparatus.

11. The medium processing apparatus of claim 10, wherein the additional unit is at least one of a coin device which processes a coin and a cheque device which processes a cheque.

* * * * *